March 15, 1960 R. C. BUTLER 2,928,880
MANUFACTURE OF SULFUR COMPOUNDS
Filed March 18, 1958
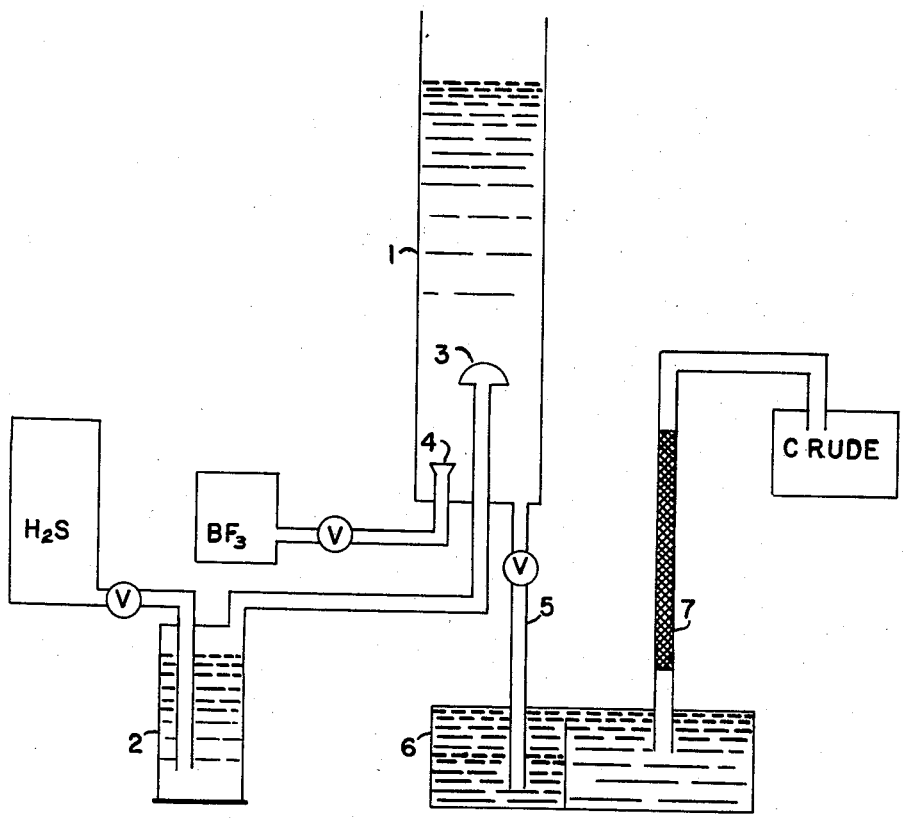
INVENTOR.
ROBERT C. BUTLER
ATTORNEY United States Patent Office 2,928,880
Patented Mar. 15, 1960

2,928,880

MANUFACTURE OF SULFUR COMPOUNDS

Robert C. Butler, El Dorado, Ark., assignor to Monsanto Chemical Company, St. Louis, Mo., a corporation of Delaware Application March 18, 1958, Serial No. 722,219

7 Claims. (Cl. 260—609)

This invention relates to the manufacture of organic sulfur compounds and more particularly to the preparation of alkyl mercaptans.

The synthesis of alkyl mercaptans by the addition of hydrogen sulfide to olefinic materials in the presence of a catalyst is well known in the art. The more significant processes of commercial importance generally utilize rather extreme reaction conditions. A process characterized by a rapid and complete reaction under relatively mild temperature conditions at substantially atmospheric pressures has not become a commercial reality. It is an object of this invention to provide such a process. Further objects will become apparent from the description of this invention.

It has now been discovered that excellent yields of alkyl mercaptans can be obtained by the reaction of an olefin and hydrogen sulfide in the presence of boron trifluoride as the catalyst and a small amount of water as a catalyst activator at mild temperatures with the substantially complete single pass reaction of $H_2S$. The process comprises passing $H_2S$ and $BF_3$ into a liquid olefin in a manner such that the $BF_3$ is mixed with the olefin before contact of the $BF_3$ with the $H_2S$ stream feed, said $BF_3$ being employed in the molar ratio of $H_2S:BF_3$ of from about 10:1 to about 100:1 and the $H_2S$ containing water in the molar ratio of $H_2O:BF_3$ of from about 0.5:1 to about 2:1.

The drawing is a schematic representation of a reaction system particularly suited to the process of this invention.

In this system, the olefin is placed in the reactor 1, $H_2S$ is passed through $H_2O$ scrubber 2 picking up $H_2O$ and the wet $H_2S$ then passed into the reactor through diffuser 3. $BF_3$ is introduced into the reactor through diffuser 4 placed at a point below diffuser 3 to permit $BF_3$ to mix with the olefin before contact with wet $H_2S$. The crude mercaptan is removed from the reactor through line 5 into tank 6 which contains $H_2O$ to quench the catalyst. The crude mercaptan layer is allowed to separate from the water and is then passed through a glass wool coalescer 7 to remove any entrained $H_2O$. The crude material may then be further purified, as by distillation, if desired.

The following examples illustrate this invention:

*Example I*

Using the system shown in the drawing, the reactor was charged with 200 ml. of tetrapropylene. $H_2S$ was bubbled through the water filled scrubber at room temperature into the olefin at the rate of one liter per minute. $BF_3$ was charged to the reactor through a separate line at the rate of 20 ml. per minute. The $H_2S:BF_3$ molar ratio was about 50:1 and the $H_2O:BF_3$ molar ratio was about 1:1. The initial reaction temperature was 25° C. and rose to 55° C. during the reaction. At the end of 25 minutes, the reaction mixture was quenched in water and the crude product was found to contain 14.5% SH or about 90% dodecyl mercaptan. More than 95% of $H_2S$ fed was reacted in a single pass.

*Example II*

The process set forth in Example I was repeated with the $H_2S$ feed by-passing the water filled scrubber. The product contained only 4.2% SH and a significant quantity of $H_2S$ passed through the olefin unreacted.

*Example III*

A 200 ml. sample of tetrapropylene was placed in a glass tube and a mixture of 98% $H_2S$ and 2% $BF_3$ was bubbled through the olefin at the rate of one liter per minute. At the end of one hour, the reaction mixture was quenched by pouring into water. The crude product recovered was found to contain 6.8% SH representing 42% dodecyl mercaptan. Only 16% of the $H_2S$ fed reacted to yield the mercaptan, the remainder of the $H_2S$ passing through the olefin unreacted. The temperature of the reaction mixture was 25° C. initially and rose to 50° C. during the run.

*Example IV*

The procedure set forth in Example I is repeated using as the olefin a 338°–360° F. cut of heavy polymer from a catalytic polymerization unit charging refinery propylene and butylenes. An excellent yield of the corresponding mercaptan is obtained with substantially complete single pass consumption of $H_2S$ fed.

*Example V*

The procedure set forth in Example I is repeated using as the olefin a natural gasoline fraction containing about 15 weight percent triisobutylene. An excellent yield of triisobutyl mercaptan is obtained with substantially complete single pass consumption of $H_2S$ fed.

*Example VI*

The procedure set forth in Example I is repeated using cyclohexene as the olefin. An excellent yield of cyclohexyl mercaptan is obtained with substantially complete single pass consumption of the $H_2S$.

A comparison of the results obtained in Examples I to III clearly illustrates the improvements obtained using the process of this invention. The process is subject to some variations. The reaction temperature can be maintained in the range of from about 20° C. to about 80° C. and preferably between about 40° C. and 60° C. The reaction is conveniently carried out at atmospheric pressure although pressure above or below atmospheric can be used if desired in a particular case.

In the practice of this invention, it is essential that $BF_3$ be mixed with the olefin before it is contacted with wet $H_2S$. This can be accomplished by the continuous method of Example I or the $BF_3$ separately dispersed in the olefin before any $H_2S$ feed is introduced. Any other convenient method can be employed for this purpose.

The olefins which may be reacted with $H_2S$ in accordance with this invention include those which contain one or more olefinic unsaturations between two aliphatic carbon atoms regardless of the class or characteristic of the compound containing such linkage. Such hydrocarbons can also contain substituent groups which are inert under the reaction conditions. Examples of olefins which can be used in this process are ethylene, propylene, butylenes, pentenes, hexenes, cyclohexene, 1-methylcyclohexene-1; propylene trimers, propylene tetramers and propylene pentamers; diisobutylenes such as 2,4,4-trimethylpentene-1, and 2,4,4-trimethylpentene-2, octene-1 and -2; triisobutylenes such as 2,2,4,6,6-pentamethylheptene-3, dodecane-1 and -2, 2-n-pentyl-4,4-dimethylpentene-1, 2,4,4,6,6-pentamethylheptene-2 and -1; 1,4-diphenylbutene-2;

tetraisobutylenes such as cetene-1 and -2; and their homologues and analogues. The olefins can be used as such or can be mixed with inert hydrocarbons.

What is claimed is:

1. A process for preparing alkyl mercaptans which comprises reacting at a temperature in the range of from about 20° C. to about 80° C. an olefin in the presence of $BF_3$ with $H_2S$ containing $H_2O$ in a manner such that the $BF_3$ is mixed with the olefin before contact of the $BF_3$ with the $H_2S$, said $BF_3$ being employed in the molar ratio of $H_2S:BF_3$ of from about 10:1 to about 100:1 and the $H_2S$ containing water in the molar ratio of $H_2O:BF_3$ of from about 0.5:1 to about 2:1.

2. A process as described in claim 1, wherein the olefin is a propylene polymer.

3. A process as described in claim 2, wherein the olefin is a propylene tetramer.

4. A process for preparing alkyl mercaptans which comprises separately passing $H_2S$ and $BF_3$ into a liquid olefin at a temperature in the range of from about 20° C. to about 80° C. in a manner such that the $BF_3$ is mixed with the olefin before contact of the $BF_3$ with the $H_2S$ stream feed, said $BF_3$ being employed in the molar ratio of $H_2S:BF_3$ of from about 10:1 to about 100:1 and the $H_2S$ containing water in the molar ratio of $H_2O:BF_3$ of from about 0.5:1 to about 2:1.

5. A process as described in claim 4, wherein the olefin is a propylene polymer.

6. A process as described in claim 5, wherein the olefin is a propylene tetramer.

7. A process for preparing alkyl mercaptans which comprises reacting at a temperature in the range of from about 40° C. to about 60° C. an olefin in the presence of $BF_3$ with $H_2S$ containing $H_2O$ in a manner such that the $BF_3$ is mixed with the olefin before contact of the $BF_3$ with the $H_2S$, said $BF_3$ being employed in the molar ratio of $H_2S:BF_3$ of from about 10:1 to about 100:1 and the $H_2S$ containing water in the molar ratio of $H_2O:BF_3$ or from about 0.5:1 to about 2:1:

References Cited in the file of this patent

UNITED STATES PATENTS 2,481,583     Fenn et al. _____ Sept. 13, 1949